United States Patent [19]
Hasegawa

[11] Patent Number: 5,212,603
[45] Date of Patent: May 18, 1993

[54] TRACKING CONTROL MEANS FOR A MULTI-CHANNEL REPRODUCING APPARATUS

[75] Inventor: Masahide Hasegawa, Kanagawa, Japan

[73] Assignee: Canon Kabushiki Kaisha, Tokyo, Japan

[21] Appl. No.: 391,162

[22] Filed: Aug. 8, 1989

[30] Foreign Application Priority Data

Aug. 26, 1988 [JP] Japan .................. 63-210612
Aug. 26, 1988 [JP] Japan .................. 63-210613

[51] Int. Cl.$^5$ .................. G11B 5/58; G11B 5/588
[52] U.S. Cl. .................. 360/77.01; 360/18; 360/77.14
[58] Field of Search .................. 360/76, 77.01, 77.02, 360/77.04, 77.06–77.16, 18–20, 22, 23; 369/44.25

[56] References Cited

U.S. PATENT DOCUMENTS

| | | | |
|---|---|---|---|
| 4,525,750 | 6/1985 | Hamalainen | 360/77.16 |
| 4,542,415 | 9/1985 | Kimura. | |
| 4,868,692 | 9/1989 | Nakase et al. | 360/77.16 |
| 4,951,162 | 8/1990 | Yoshimura et al. | 360/77.14 |

FOREIGN PATENT DOCUMENTS

| | | |
|---|---|---|
| 0046341 | 2/1982 | European Pat. Off. . |
| 0054419 | 6/1982 | European Pat. Off. . |
| 0197666 | 10/1986 | European Pat. Off. . |
| 60-214443 | 10/1985 | Japan .................. 360/76 |
| 60-246047 | 12/1985 | Japan .................. 360/77.15 |
| 63-64659 | 8/1988 | Japan . |
| 2097968 | 11/1982 | United Kingdom . |

OTHER PUBLICATIONS

ITEJ Technical Report vol. 11, No. 14, "Index Tracking Control for VTR", Itoh et al., Aug. 1987, pp. 13–18.

Primary Examiner—Jerry Smith
Assistant Examiner—Steven R. Garland
Attorney, Agent, or Firm—Robin, Blecker, Daley & Driscoll

[57] ABSTRACT

A reproducing apparatus is arranged to extract a specific signal respectively from signals reproduced by a plurality of heads provided for reproducing signals recorded in parallel in a plurality of channels on a recording medium, to detect a phase difference between the extracted specific signals, and to control the position of the plurality of heads relative to the recording medium in accordance with the phase difference detected.

16 Claims, 9 Drawing Sheets

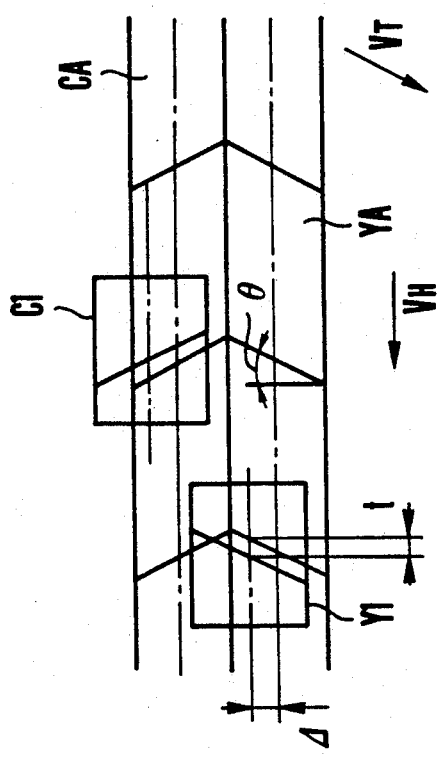
FIG.4
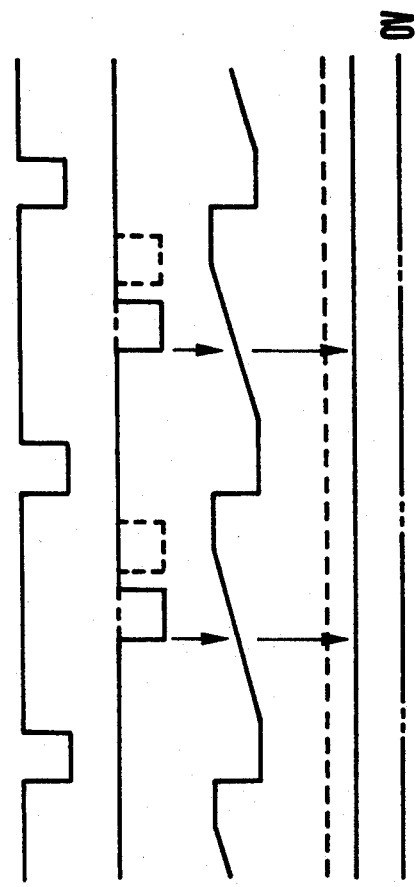
FIG.5(a)
FIG.5(b)
FIG.5(c)
FIG.5(d)

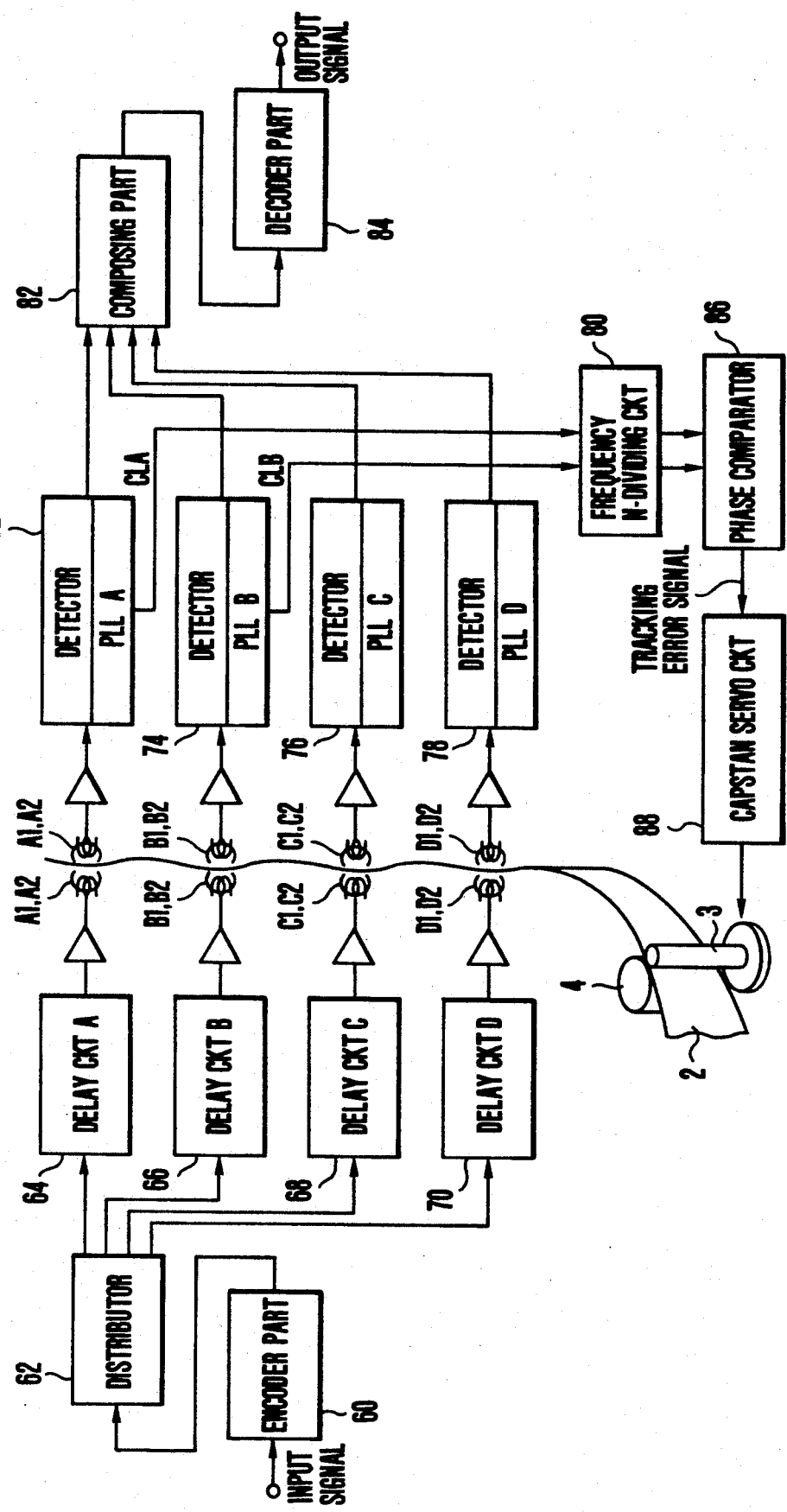

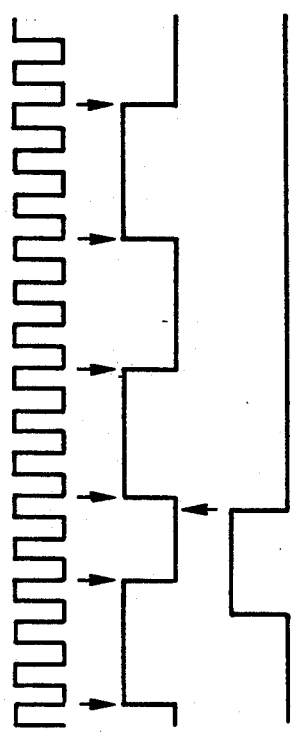
FIG.9(a)
FIG.9(b)
FIG.9(c)
FIG.8
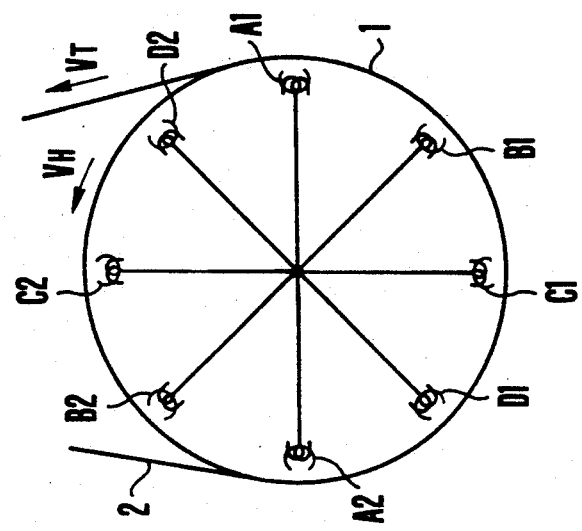
FIG.7

FIG.13(a) f1 COMPONENT 
FIG.13(b) f2 COMPONENT 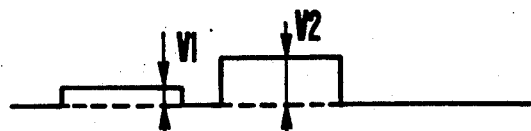
FIG.13(c) GATE PULSE 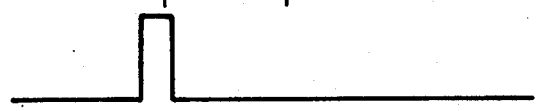
FIG.13(d) GATE PULSE
FIG.13(e) S/H OUTPUT 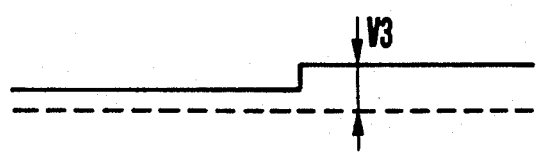
FIG.13(f) TIMING PULSE FOR S/H 
FIG.13(g) INTER-CHANNEL PHASE DIFFERENCE SIGNAL 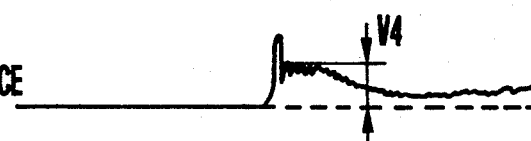
FIG.13(h) TRACKING ERROR SIGNAL S142 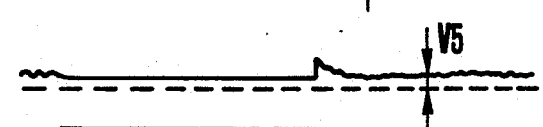
FIG.13(i) TIMING SIGNAL S144B 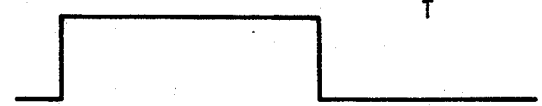
→ t

FIG.16
| SUB | P | VIDEO | AUDIO |
FIG.15(a)
FIG.15(b)
P: PILOT SIGNAL AREA
D: DATA AREA
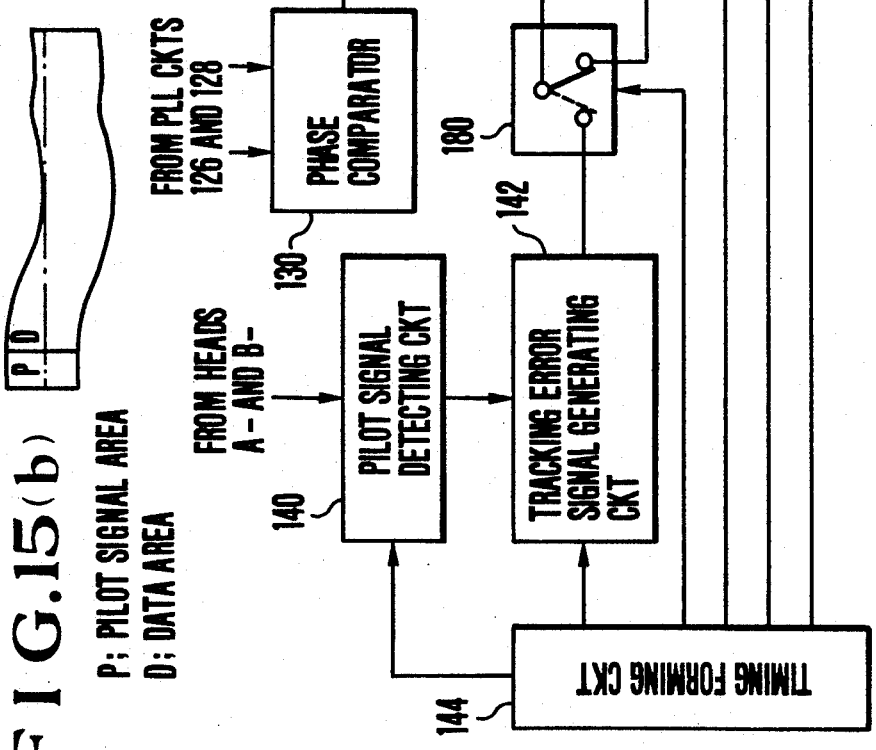
FIG.17

TRACKING CONTROL MEANS FOR A MULTI-CHANNEL REPRODUCING APPARATUS

BACKGROUND OF THE INVENTION

1. Field of the Invention

This invention relates to a reproducing apparatus and more particularly to a reproducing apparatus having tracking control means for controlling the position of a reproducing head relative to a recording medium.

2. Description of the Related Art

The known apparatuses of the above-stated kind include helical scanning type magnetic recording/reproducing apparatuses. These known helical scanning type magnetic recording/reproducing apparatuses employ five different tracking control methods, which are as follows:

(1) CTL (control) method: A control signal of a given frequency is recorded along the edge of a magnetic recording tape and a tracking control signal is obtained by reproducing this control signal.

(2) Pilot signal superimposing method: A pilot signal of a low frequency is frequency superimposed on a main information signal and a tracking control signal is formed according to the pilot signal when the pilot signal is reproduced.

(3) Area dividing pilot signal method: A pilot signal is recorded in a recording area other than that of a main information signal and a tracking control signal is formed according to the pilot signal when the pilot signal is reproduced.

(4) Index tracking method: A tracking control signal is formed according to a phase difference between a phase detection signal indicative of the phase of a rotary head and a horizontal synchronizing signal included in a reproduced signal. This method has been disclosed in "Television Society Technical Report", Vol. 11, No. 14, pages 13–18, dated Aug. 31, 1987.

(5) Envelope detection method: A head is vibrated and a tracking control signal is formed according to the envelope level of a signal reproduced by the head.

However, the above-stated methods (1) to (5) respectively have the following shortcomings:

(1) In the CTL method:

(i) This method necessitates the use of an additional CTL (control) track and a CTL head. (ii) Since a period through which tracking control information is obtainable is long, the responsivity of tracking control becomes slow. (iii) The position of a fixed head in the longitudinal direction of the tape must be adjusted.

(2) In the pilot signal superimposing method:

(i) The frequency multiplexing arrangement is apt to bring about a code error in the case of digital recording which tends to be affected by a low band. (ii) Since the pilot signal is recorded at a low level to avoid an adverse effect on a main signal, a poor S/N ratio results from this method.

(3) In the area dividing pilot signal method:

(i) It necessitates an additional area, which reduces the area allottable for main signal recording. (ii) The tracking control responsivity is slow as only one or two samples of tracking control information is obtainable per turn of a rotary head. In order to solve this problem, many pilot signal recording areas are necessary for increasing the number of samples. Such arrangement would further reduce the main signal recording area. In the case of a digital audio tape recorder (DAT) in particular, the main signal (or audio data) occupies only 60% of the whole track length with pilot signal recording area provided before and after the main signal recording area. However, in a case where the main signal is video data which requires a high speed and large capacity, at least 90% of the whole track length is allotted for the main signal, thus leaving only narrow areas for pilot signal recording at two end parts of each track. This presents a serious problem for following the curved parts of tracks in furthering the density of recording.

(4) In the index tracking method: detection signal is used as a reference signal. This imposes a limit on the actual sampling rate. Further, the method necessitates a highly precise phase detecting means in order to obtain several samples of the tracking control signal per track. (ii) It is inevitable to have the adverse effect of jitters during one turn of a drum (or cylinder).

(5) In the envelope detection method:

This method is employed in combination with the so-called wobbling or the like in cases where the tracking control is to be performed by moving a rotary head by means of a bimorph element or the like. The method, therefore, requires a moving head and thus results in a very complex, expensive system as a whole.

All the conventional methods thus have various problems in terms of responsivity, accuracy, etc., and have failed to ensure an adequate performance.

SUMMARY OF THE INVENTION

This invention is directed to the solution of the above-stated problems of the prior art. It is therefore an object of the invention to provide a reproducing apparatus which is capable of accurately performing a tracking control operation at a high response speed.

It is another object of the invention to provide a reproducing apparatus which is of the kind reproducing main information signals of a plurality of channels and is capable of obtaining an accurate control signal without having any special signal recorded for that purpose.

Under this object, a reproducing apparatus which is arranged according to one mode of this invention to reproduce signals of a plurality of channels from a recording medium having the signals of the plurality of channels recorded in parallel to each other comprises: a plurality of head means arranged to trace in parallel the recording medium for reproducing the signals of the plurality of channels; a plurality of extracting means for extracting specific signals from a plurality of signals reproduced by the plurality of head means; detecting means for detecting a phase difference between signals extracted by the plurality of extracting means; and tracking control means for controlling the position of the plurality of head means relative to the recording medium in accordance with the phase difference detected.

It is another object of the invention to provide a reproducing apparatus which eliminates the shortcomings of the conventional tracking control systems and is capable of accurately performing tracking control with a high response speed despite the simple arrangement thereof.

Under that object, a reproducing apparatus arranged according to one mode of this invention to reproduce an information signal from a recording medium, on which recording tracks of the information signal are formed, comprises head means arranged to trace the recording medium for reproducing the information signal; first means for generating a first detection signal at a level according to the phase of a first specific signal included in the signal reproduced by the head means; second means for generating a second detection signal at a level according to the level of a second specific signal included in the signal reproduced by the head means; and tracking control means for controlling the position of the head means relative to the recording medium by using the first and second detection signals.

Other objects and features of the invention will become apparent from the following detailed description of embodiments thereof taken in connection with the accompanying drawings.

BRIEF DESCRIPTION OF THE DRAWINGS

FIG. 1 is a top view showing the rotary heads of the first embodiment.

FIG. 4 shows the principle of having a time difference between signals reproduced from adjacent tracks.

FIGS. 5(a) to 5(d) show in a chart the signal wave forms produced from a phase comparator.

FIG. 6 is a block diagram showing a second embodiment of this invention.

FIG. 7 is a top view showing the rotary heads of the second embodiment.

FIG. 8 shows a data format employed by the second embodiment.

FIGS. 9a) to 9c) show in a wave form chart the operation of a frequency n-divider included in the second embodiment.

FIGS. 13(a) to 13(i) show the signal wave forms of various parts of the arrangement shown in FIG. 11.

FIGS. 15(a) and 15(b) show a curved state of tracks.

FIG. 16 shows the recording format of a fourth embodiment of this invention.

FIG. 17 is a block diagram showing the arrangement of the essential parts of the fourth embodiment of the invention.

DETAILED DESCRIPTION OF THE PREFERRED EMBODIMENTS

The details of this invention will be understood from the following description of preferred embodiments thereof given with reference to the accompanying drawings:

FIRST EMBODIMENT

Figure 1:
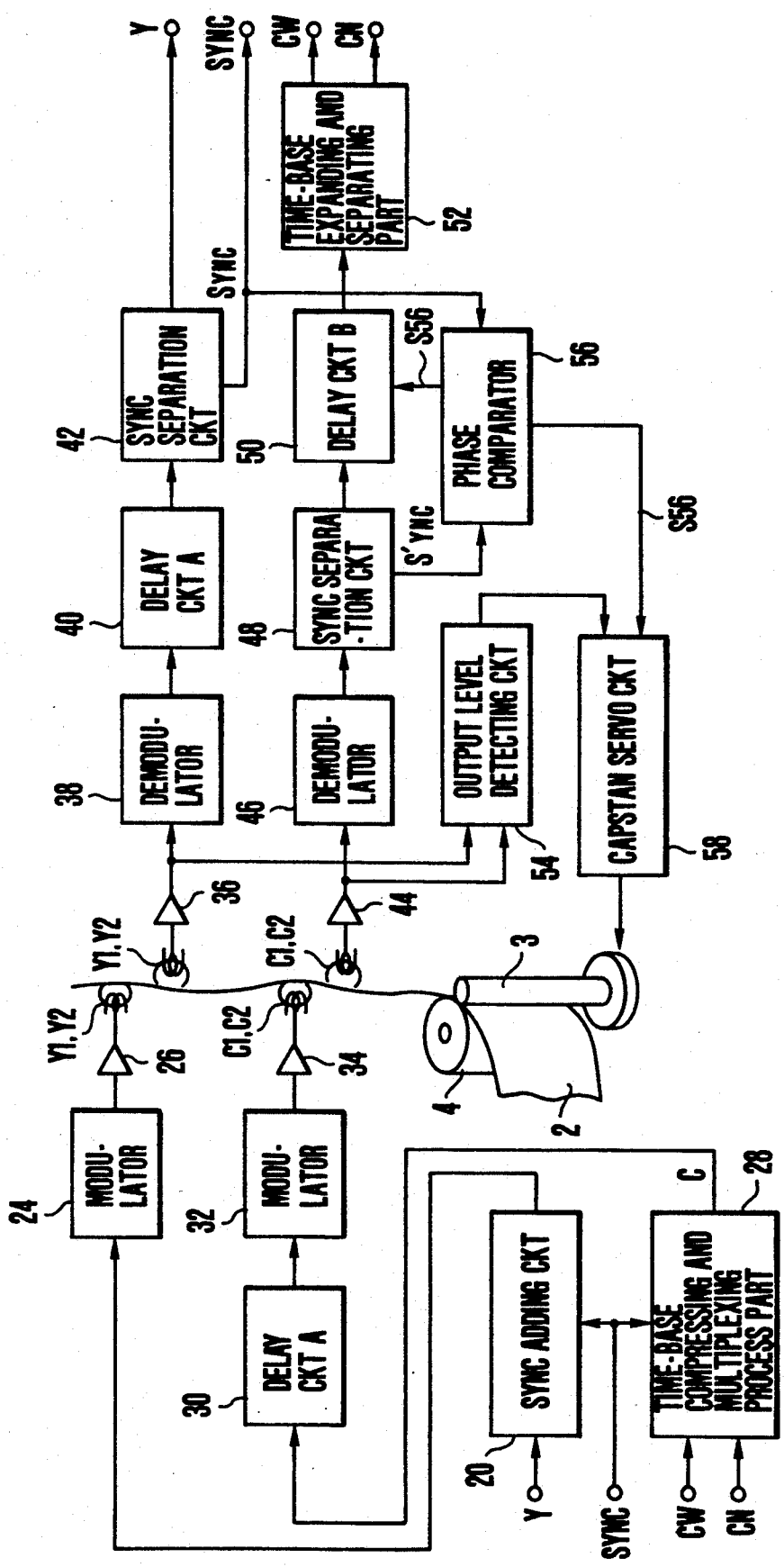
FIG. 1 is a block diagram showing a first embodiment of this invention.
Figure 2:
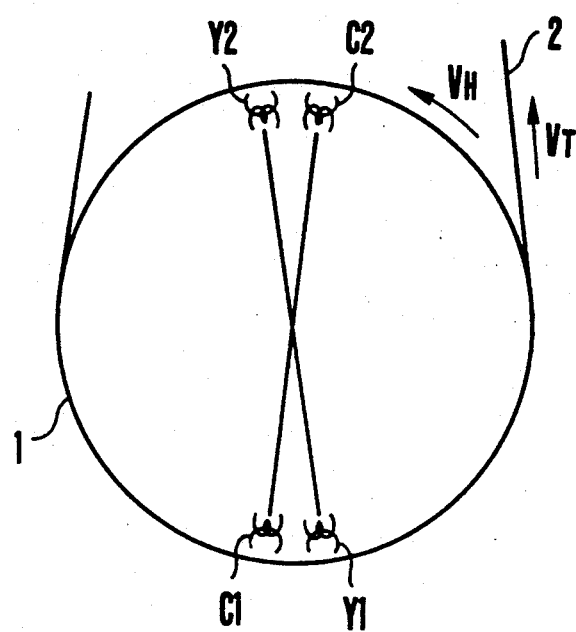
Figure 3:
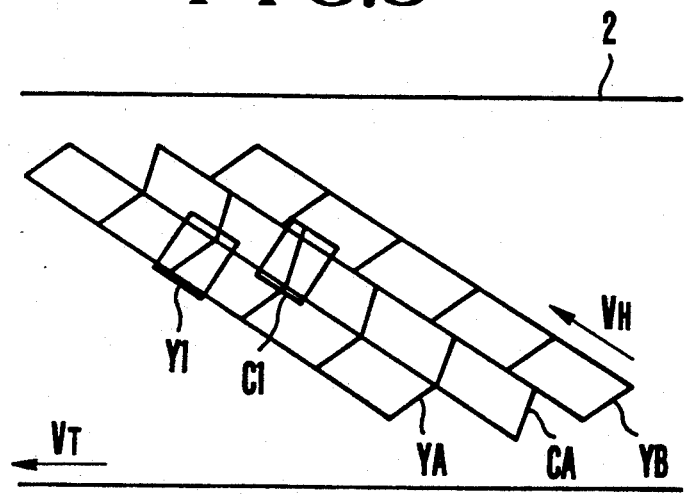
FIG. 3 shows a track pattern obtained by the first embodiment.

FIGS. 1 to 5 show a color image recording and reproducing apparatus which is arranged as a first embodiment of the invention. FIG. 1 is a block diagram showing the arrangement of the whole apparatus. FIG. 2 is a top view showing the allocation of rotary heads included in the embodiment. FIG. 3 shows a track pattern obtained on a magnetic tape. FIGS. 4 and 5(a) to 5(d) show how a tracking error signal is formed respectively in a pattern and in a wave-form chart. Referring to these drawings, the embodiment is arranged as described below:

Four heads Y1, Y2, C1 and C2 are mounted on a rotary drum 1 to be revolved at a given rotation speed VH. The magnetic tape 2 is wrapped about 180 degrees around the rotary drum 1. A capstan 3 and a pinch roller 4 jointly cause the tape 2 to travel at a given speed VT. Under this condition, recording tracks are obliquely formed on the tape 2 as shown in FIG. 3. The heads Y1 and Y2 and the heads C1 and C2 are respectively paired and are arranged to have an azimuth angle of $\pm\theta$ in such a manner as to leave no guard band for high density recording.

The signal processing operation of the first embodiment is as described below with reference to FIG. 1:

In recording, the embodiment is arranged to receive as input signals (1) a luminance signal Y, (2) a wide-band chrominance signal CW, (3) a narrow-band chrominance signal CN and (4) horizontal and vertical synchronizing signals separately from each other. A synchronizing (hereinafter referred to as sync for short) signal is added to the luminance signal Y at a sync signal adding circuit 20. After that, the signal Y is frequency modulated by a frequency modulator 24. The signal Y is then amplified by an amplifier 26. The amplified luminance signal Y is recorded by the heads Y1 and Y2 on the magnetic tape 2. The wide-band and narrow-band chrominance signals CW and CN are supplied to a time base compressing and multiplexing process part 28 to be time-base compressed to ½ respectively by means of a memory, a CCD or the like. After that, they are time-base multiplexed into one chrominance signal C. A sync signal is added to this chrominance signal C. The signal C is then delayed by a delay circuit 30 for a delay time A. The signal C which is thus delayed is supplied to a frequency modulator 32 to be frequency modulated. The modulated signal C is amplified by an amplifier 34 and, after that, is recorded on the magnetic tape 2 by the heads C1 and C2.

At the time-base compressing and multiplexing process part 28, there arises a time delay of more than ½ horizontal period. As a result, at the point of time when the signal C is produced from the process part 28, a time difference arises between the luminance signal Y and the chrominance signal C. As shown in FIG. 2, the heads Y1 and C1 are located adjacent to the heads Y2 and C2 respectively. However, in order to prevent an increase in cross-talk as well as to ensure a sufficient mechanical strength and a high degree of accuracy, these heads must be physically separated at least to a given extent. This spacing distance results in some discrepancy in recording timing between the signals C and Y. In order to have the writing positions of the sync signals kept in a given relation for each of the recording tracks, therefore, the recording timing of the signal Y and that of the signal C must be adjusted or coordinated. To meet this requirement, the recording positions of the sync signals are kept in the predetermined relation for each track.

The reproducing operation of the embodiment is as follows: A reproduced frequency-modulated signal obtained from the heads Y1 and Y2 is supplied via a reproduction amplifier 36 to a frequency demodulator 38 to be demodulated. The demodulated signal is supplied to a delay circuit 40 which has a delay time A. The delayed signal is supplied to a sync separation circuit 42 to be divided into a luminance signal and a sync signal, which are produced respectively from the circuit 42. Meanwhile, a reproduced frequency modulated chrominance signal which is obtained from the heads C1 and C2 is supplied via a reproduction amplifier 44 to a frequency demodulator 46 to be frequency demodulated. The demodulated signal is then supplied to a sync separation circuit 48 to be divided into a chrominance signal and a sync signal. The chrominance signal thus separated is supplied via a delay circuit 50 to a time-base expanding and separating part 52. The part 52 then divides it into wide-band and narrow-band signals CW and CN and produces them therefrom.

The sync signals which are separated respectively by the circuits of the luminance and chrominance systems are supplied to a phase comparator 56. The phase comparator 56 produces a tracking error signal S56 which indicates a phase difference between these sync signals and is supplied to a capstan servo circuit 58 and to a delay circuit 50.

The capstan servo circuit 58 performs a tracking control action in accordance with the error signal S56. The delay circuit 50 changes its delaying degree also in accordance with the error signal S56 in such a way as to cause the timing of the chrominance signal output thereof to coincide with the luminance signal produced.

Referring to FIG. 4, the principle of obtaining the tracking error signal from the above-stated two sync signals is as follows: Let us assume that the tracking operation by the heads vertically deviates as much as Δ relative to the tracks in the direction opposite to the tape feeding direction as shown by an arrow VT. In this instance, the head Y1 which has a clockwise azimuth relative to the head moving direction (shown by an arrow VH) performs reproduction earlier by a distance $t=\Delta \tan \theta$ than in the case of normal tracking. The head C1 which has an opposite azimuth reproduces signals from each track later by the distance t than normal tracking. In other words, for a tracking error Δ, there is a time difference T between signals reproduced by the head Y1 and C1, which can be expressed as follows:

$$T = 2t/VH = 2\Delta \tan \theta / VH \quad (1)$$

If $\Delta = 1$ μm, $\theta = 10°$ and VH=6 m/s, the value of the time difference T becomes about 0.06 μsec. Therefore, if the horizontal sync signal is at a frequency 15.75 KHz, the time difference value corresponds to a phase difference of about 0.1%, which indicates a sufficiently high degree of detection sensitivity.

FIGS. 5(a) to 5(d) show signal wave forms obtained when the phase comparing action described above with reference to FIG. 4 is performed by using a sample-and-hold circuit. In this case, one of two sync signals obtained from the sync separation circuits 42 and 48 is used as a reference signal as shown in FIG. 5(a). From this signal is formed a saw-tooth wave as shown in FIG. 5(c). This saw-tooth wave is sampled according to the other sync signal which is as shown in FIG. 5(b) and is held until arrival of a next sampling time. Through this process, a tracking error signal is obtained as shown in FIG. 5(d). In these drawings, broken lines indicate a change occurred in the phase difference.

The tracking error signal S56 is obtainable with the two sync signals supplied to the phase comparator 56 in the above-stated manner. However, in the event of an excessive deviation from the track, it is impossible to obtain sufficient signal outputs from the heads. This invention is, therefore, provided with an output level detecting circuit 54 to find that the outputs of the heads Y1, Y2, C1 and C2 are obtained at levels above a given level. The tracking control is performed only in that case according to the tracking error signal S56 produced from the phase comparator 56.

In the first embodiment described, the tape is interchangeable with another tape as long as the sync signal position in one track is in a prescribed positional relation to that sync signal position in another track. Further, this embodiment is arranged to use a standard tape on which a reference tape pattern is recorded beforehand for the purpose of absorbing such errors as the mounting phase error of the head, etc. The delaying degrees A of the delay circuits 30 and 40 are thus adjusted according to the reference tape pattern for interchangeability between tapes. More specifically, the arrangement is as follows: The chrominance signal lags behind the luminance signal when the above-stated standard tape is reproduced under a condition wherein the heads Y1 and C1 are spaced to a greater extent than a given distance. In that event, the delaying degrees of the delay circuits 30 and 40 are increased to retard the luminance signal, so that the phase difference between the luminance signal and the chrominance signal can be adjusted to a given value. This adjustment enables the chrominance signal to pass through the delay circuit 30 (which has the same delaying degree A as the delay circuit 40) during the process of recording. Therefore, a head mounting phase error can be compensated for by this arrangement to ensure that the recording can be performed in the same pattern as that of the standard tape.

Since the mechanical mounting positions of the heads Y1 and C1 differ from those of the heads Y2 and C2, the delaying degrees of the delay circuits for these heads must be differently set accordingly.

Further, the arrangement of the embodiment may be changed to obtain a tracking error signal only relative to the heads Y1 and C1 and to hold the tracking error signal for the remaining period. Further, it is preferable to hold the tracking error signal because of the possibility of a faulty action before and after switching the use of the head from one head over to another and also in the neighborhood of a vertical retrace period.

While the delay circuits 30 and 40 are arranged to be used both for recording and for reproduction in the case of this embodiment, the circuits may be arranged separately for recording and for reproduction. In other words, the delaying degree of the time-base compressing and multiplexing process part 28 may be arranged to be set in association with the delaying degree of the delay circuit 40 to be obtained at the time of reproduction.

In accordance with the arrangement of the first embodiment, as described in the foregoing, a tracking system can be formed with a few additional circuits. The use of the horizontal sync signals in obtaining the tracking error signal enables the embodiment to excel both in responsivity and accuracy. Further, the use of signals obtained from two adjacent heads prevents the tracking error signal from being excessively affected by jitters resulting from the operation of the rotary drum. The embodiment requires no special area on the tape, no additional head and no signal band for the tracking control.

In the case of the first embodiment shown in FIG. 1, the apparatus is arranged to receive and produce the signals Y, CW and CN. However, in accordance with this invention, the input and output signals are not limited to them. While the embodiment is arranged to have the signal Y and the time-base compressed signal C recorded in parallel to each other, the invention is not limited to this recording method. In other words, the invention is applicable to any apparatus of the kind recording or reproducing signals which include sync signal components in two or more than two parallel channels.

Further, this invention is applicable also to an apparatus of the kind performing tracking control by shifting the head in the direction of the track width by means of a bimorph element or the like with signals of two adjacent heads arranged to be used in accordance with the invention. Since the tracking control information extracting period is short, the tracking control can be accomplished with adequate responsivity.

SECOND EMBODIMENT

FIGS. 6, 7, 8 and 9(a) to 9(c) show a digital signal recording and reproducing apparatus to which this invention is applied as a second embodiment thereof. FIG. 6 shows in a block diagram the whole arrangement of the second embodiment. FIG. 7 shows the allocation of rotary heads. FIG. 8 shows the data recording format. FIGS. 9(a) to 9(c) show signal wave forms of parts shown in FIG. 6. As shown, the second embodiment is arranged to perform recording and reproduction by using a total of eight heads A1, A2, B1, B2, C1, C2, D1 and D2.

In recording or reproducing signals at such a high speed as scores to several hundreds of mega-bps as in the case of a digitized video signal, the signal must be recorded by dividing and allotting it to a plurality of channels. In the case of the second embodiment, recording or reproduction is performed by simultaneously operating circuits of four channels.

The eight heads A1 to D2 are mounted on a rotary head drum 1. A tape 2 is wrapped 180 plus alpha degrees around the drum 1. With the tape allowed to travel under this condition, recording tracks are obliquely formed one after another in the same manner as in the case of the first embodiment. The heads A1, A2, C1 and C2 are arranged to have an azimuth opposite to that of other heads B1, B2 and D1 and D2. Therefore, like in the case of the first embodiment, a difference of time T arises between signals reproduced from adjacent tracks for deviation of the heads from their tracks (see Formula (1)).

Signals are recorded in each track in accordance with a format which is as shown in FIG. 8, wherein: a reference symbol SYNC denotes a signal for a given pattern which cannot be expressed within ordinary data having, for example, a continuous series of "1". The signal SYNC is in the leading part of data. A symbol ID denotes a signal indicating an address accompanying the data. A symbol DATA denotes a real data part. A symbol ECC denotes a correction code which is provided for detecting and correcting any error occurred in the data part DATA.

The second embodiment operates as follows:

In recording, an input signal is supplied to an encoder part 60. The encoder part 60 then performs necessary processes for magnetic recording including rearrangement of data, an ID signal adding process, an ECC adding process, etc. After the encoder part 60, the input signal is supplied to a distributor 62 to be divided and distributed to four channels. The signals of these channels are supplied to delay circuits 64, 66, 68 and 70 to have their timing adjusted for recording.

In reproduction, the reproduced signal obtained from each head is subjected to a wave-form equalizing process as its wave form has changed, due to a differentiation characteristic, etc., from the wave form obtained at the time of recording. A PLL circuit is arranged to form a reproduction clock signal following a clock signal component included in the reproduced signal. The reproduced signal is sampled in accordance with the reproduction clock signal of the PLL circuit. The reproduced signal is thus converted into a digital signal form to be restored to its original state. These signal processing actions are performed by circuits 72 to 78 shown in FIG. 6. After that, the digital signals of the four channels are combined together by a composing part 82. The output of the composing part 82 is supplied to a decoder part 84. The decoder part 84 then performs various processes in a manner reverse to those performed by the encoder part 60. An output signal is obtained through these processes.

Further, the clock signal CLA of a PLL circuit A which follows the reproduction outputs of the heads A1 and A2 and the clock signal of another PLL circuits B which follows the reproduction outputs of the heads B1 and B2 are supplied respectively to a frequency n-dividing circuit 80. These clock signals are frequency divided by an "n" number and, after that, are supplied to a phase comparator 86. The phase comparator 86 then compares the phases of these outputs of the frequency n-dividing circuit 80. As a result, a tracking error signal is obtained. The reason for frequency dividing the clock signals produced from the above-stated PLL circuits is as follows: The PLL clock signals are at a very high frequency which is about two times as high as the maximum frequency of the recording signal. If the clock signal frequency is allowed to remain as it is, even a slight degree of off-track tracking would result in a time deviation exceeding more than one cycle. Then, it would make the dynamic range of the tracking control too narrow. It is, therefore, necessary to divide the excessively high frequency in such a way as to ensure that the phase difference between the two signals compared never comes to exceed ±180 degrees even in the event of a time difference corresponding to such an off-track (track deviating) degree that gives a constant output (±½ track pitch, for example). This frequency dividing circuit 80 is arranged to frequency divide the falls of the clock signal produced as shown in FIG. 9(a) from each of the PLL circuits by eight to obtain a wave form as shown in FIG. 9(b). Even after frequency dividing by n, a phase difference between signals obtained from the heads is detectable by resetting the frequency divider with a signal which indicates the timing of the ID signal, i.e., an ID pulse indicating a fixed position within the track as shown in FIG. 9(c).

Further, the above-stated tracking error signal is obtained within a period during which the two heads A1 and B1 or A2 and B2 are simultaneously in contact with the tape. In the case of the second embodiment, however, one of the two heads detaches from the tape for about ¼ period. Therefore, the tracking error signal must be held for the ¼ period. It is possible to likewise obtain the tracking error signal by using other PLL circuits C and D instead of the PLL circuits A and B.

Like in the case of the first embodiment, the phase comparator 86 must be arranged to separately set the phase relation of the signals coming from the PLL circuits A and B in accordance with the mounting phase difference between the heads A1 and A2 and between the heads A2 and B2. This purpose is attainable by delaying one of the signals from the PLL circuits A and B for a given period of time before supplying it to the phase comparator 86. This delaying degree is arranged to be adjustable separately for the heads A1 and B1 and the heads A2 and B2. Further, in order to permit the adjustment for interchangeable use mentioned in the foregoing, the standard tape is reproduced for adjustment of the above-stated delaying degree. Then, the delaying degrees of the delay circuits A and B to be employed in recording are changed according to the adjusted delaying degree.

In the second embodiment described, the circuits which are additionally provided for the tracking control include only the frequency n-dividing circuit 80 for the PLL clock signals, the phase comparator 86 and the recording signal delaying degree varying parts (circuits) 64 to 70. Therefore, tracking control can be accomplished with a few additional circuits. An off-track detection range and a tracking control information extracting period can be set as desired by selecting the frequency dividing rate of the frequency n-dividing circuit 80. Further, since the tracking error information can be formed when the sync pulse is detected once, the tracking control information extracting period is short. Therefore, a tracking servo system can be arranged to have excellent responsivity.

As described in the foregoing, the reproducing system of the first or second embodiment is capable of performing accurate, quickly responsive tracking control without recourse to a large additional circuit arrangement and any additional head by virtue of the arrangement to obtain the error signal for tracking control by comparing the phases of signal components of a given frequency which are included in the signals of two parallel channels.

THIRD EMBODIMENT

Figure 10:
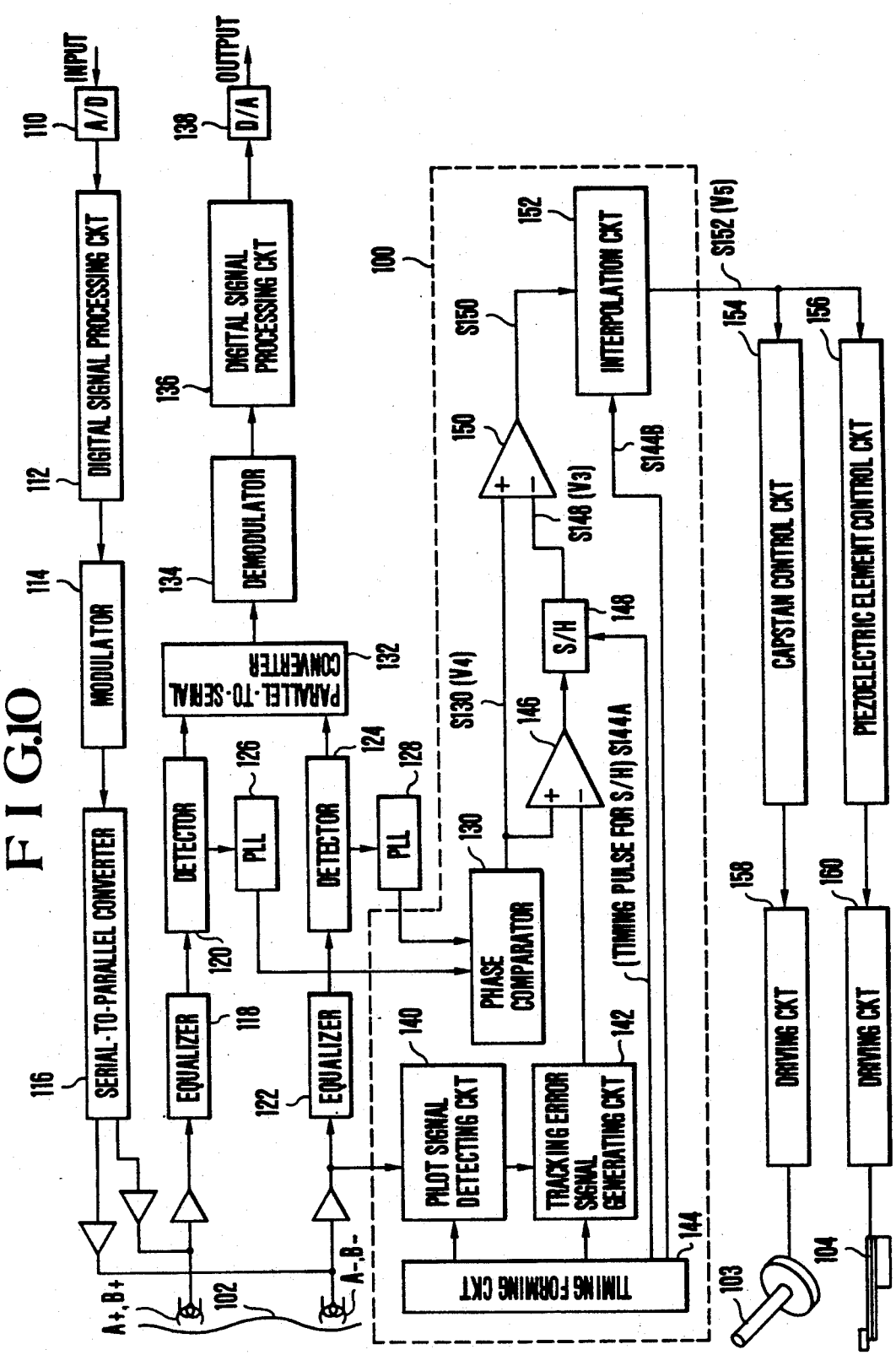
FIG. 10 is a block diagram showing a third embodiment of this invention.
Figure 11:
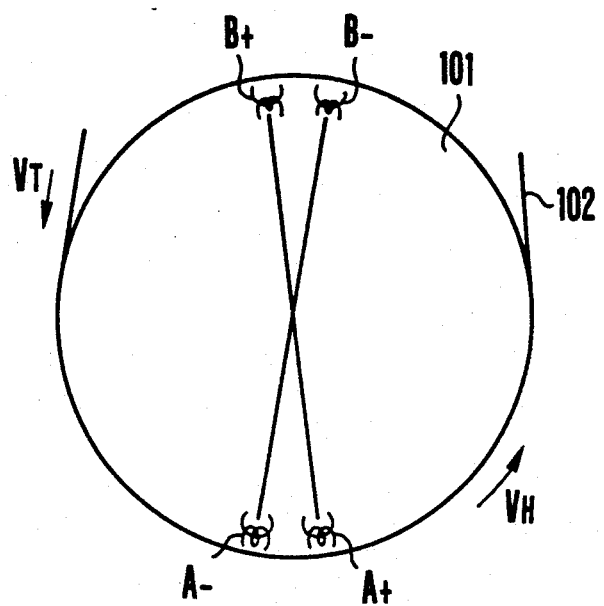
FIG. 11 is a top view schematically showing the arrangement of the rotary heads of the third embodiment.
Figure 12:
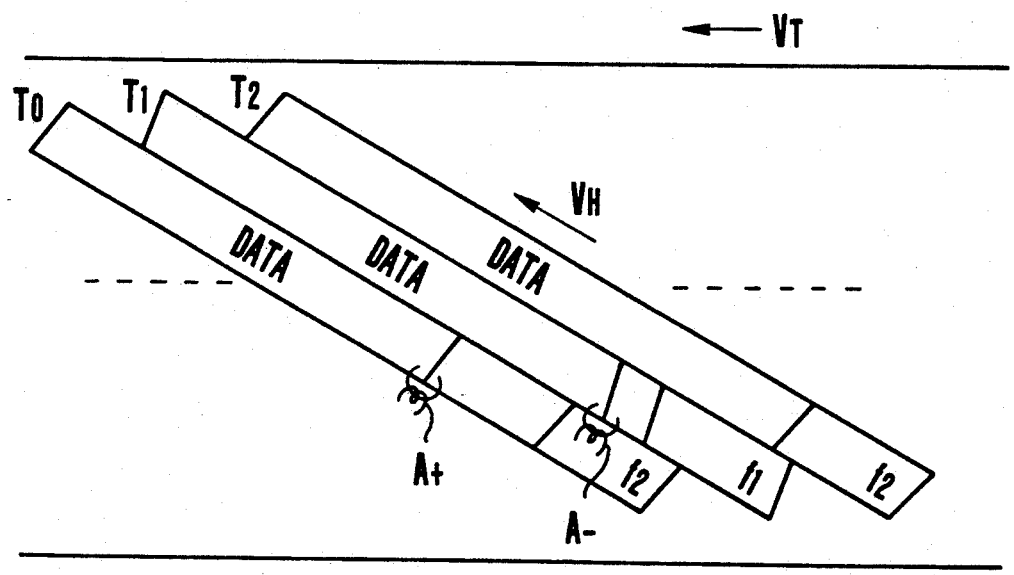
FIG. 12 shows the recording pattern of the third embodiment obtained on a tape.

A third embodiment of this invention which is a digital video tape recorder (DVTR) is arranged as shown in FIGS. 10, 11, 12 and 13(a) to 13(i). FIG. 10 is a block diagram showing in outline the arrangement of the DVTR including a tracking control circuit arranged according to this invention. FIG. 11 schematically shows the allocation of heads on a rotary head drum employed in the third embodiment. FIG. 12 shows a recording pattern obtained on a tape in recording tracks formed by the rotary heads. FIGS. 13(a) to 13(i) show in a signal wave form chart the operation of the third embodiment shown in FIG. 10. Referring to these figures, the rotary head drum 101 has four heads including a closely adjacent pair of heads A+ and A− and another pair of heads B+ and B−. These pairs of heads are mounted on the drum in 180° spaced opposite positions. A magnetic tape 102 is wrapped 180 plus alpha degrees around the head drum 101.

When the rotary head drum 101 is rotated at a circumferential speed VH in the direction of arrow while the tape 102 is allowed to travel at a speed VT in the direction of arrow as shown in FIG. 11, a track pattern is obtained on the tape as shown in FIG. 12. At the leading parts of the tracks formed on the tape, pilot signals f1 and f2 of two different frequencies are alternately recorded for a given period of time. Each track has a data area DATA following the pilot signal f1 or f2.

Next, the operation of the third embodiment is described with reference to each block shown in FIG. 10 as follows: In recording, an input signal is A/D (analog-to-digital) converted by an A/D converter 110. The A/D converted input signal is supplied to a digital signal processing circuit 112 to be subjected to processes of varied kinds such as data compression, interleaving, ID data addition, etc. After the processing circuit 112, the input signal is supplied to a modulator 114 to undergo a modulating process for conversion into a form suited for magnetic recording, such as 8-12 modulation, etc. The modulated signal is supplied to a serial-to-parallel converter 116 to be converted into signals of two channels and also to have the pilot signals f1 and f2 (see FIG. 12) added to the leading parts of tracks before recording by the heads A+ and A− or B+ and B−.

In reproduction, reproduced signals obtained from the heads are supplied to equalizers 118 and 122 to undergo a wave form equalizing process. The equalized signals are supplied to detectors 120 and 124 to have their clock signal components detected. Then, data is reproduced by PLL circuit 126 and 128. After that, reproduction processes are performed in a manner reverse to the recording processes. The signals of the two channels are converted into one channel signal by a parallel-to-serial converter 132. The signal thus obtained is demodulated by a demodulator 134. The demodulated signal is supplied to a digital signal processing circuit 136 to undergo processes of varied kinds such as error correction, deinterleaving, etc. The signal is thus converted into the original digital signal. The digital signal is then supplied to a D/A (digital-to-analog) converter 138 to be converted into analog image information.

During the process of reproduction, tracking control must be performed to have each head correctly trace the tracks formed on the tape. The tracking control is performed by a tracking control part 100. The tracking control part 100 operates as described below:

As shown in FIG. 12, the pilot signal f1 or f2 is recorded at the leading part of each track. First, the reproduced signal obtained from the head A− is supplied to a filter, a square-law detector, etc. (not shown) to detect the pilot signal component f1. A signal wave form of the pilot signal component f1 is then obtained as shown in FIG. 13(a). The pilot signal component f2 is likewise detected from the reproduced signal obtained from the head A−. By this, a signal wave form is obtained as shown in FIG. 13(b). As apparent from FIG. 12, a value V1 is detected from an upper track T2 and a value V2 from a lower track T0. Therefore, a tracking error signal S142 can be obtained by comparing their magnitude values. For that purpose, gate pulses are formed as shown in FIGS. 13(c) and 13(d) from the rise and fall of the wave form of FIG. 13(a). Then, the wave form of FIG. 13(b) is sampled by using the gate pulses and the levels of the samples are compared to obtain the tracking error signal.

The tracking error signal S142 is obtained in this manner for the pilot signal area. However, the invention is applicable not only to such a DVTR as the third embodiment described but also to such an arrangement that uses pilot signals of four different frequencies as normally used for a DAT. In other words, the invented arrangement is applicable to any DVTR that obtains a tracking error signal by using a given pilot area.

Figure 14:
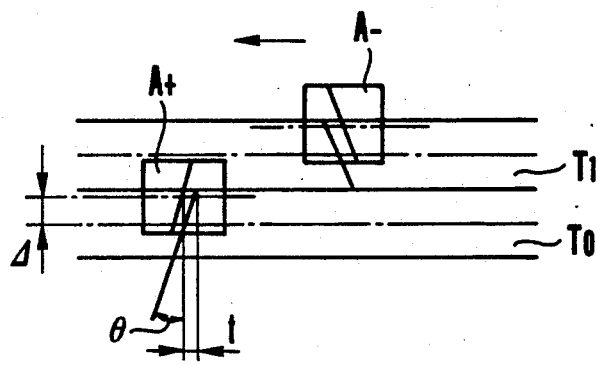
FIG. 14 shows a phase difference between signals of two channels.

In order that the tracking control is continuously performed, an inter-channel phase difference is used for tracking control in addition to the above-stated pilot area. With the inter-channel phase difference used, an accurate tracking error signal S130 can be obtained for the whole track area. Referring to FIG. 14, the inter-channel phase difference is detected by utilizing the fact that, for a tracking error $\Delta$, a discrepancy arises to an extent $t=\Delta/\tan\theta$ in the signal phase direction according to the direction of the azimuth $\theta$. In the case of FIG. 14, the reproduction timing (or phase) of the signal reproduced by the head A+ is in advance while that of the signal reproduced by the head A— is in retard. The phase difference between these reproduced signals is in a proportional relation to the tracking position. This phase difference, therefore, can be used as a tracking error signal. However, the center of the track cannot be accurately detected by using this signal S130 alone. Therefore, automatic tracking control is impossible with this phase difference used alone. It is necessary to separately provide a reference phase from the outside. In order to obtain this reference phase, the third embodiment uses a differential amplifier 146 and a sample-and-hold (S/H) circuit 148.

Generally, any wavy state of a track formed on the tape gently takes place. A positional relation obtained between the head and the track by the tracking control performed in the pilot area thus can be assumed to be not much changing for a while. Therefore, the above-stated reference phase is arranged to be obtained on the basis of an inter-channel phase difference signal S130 which is obtained at the leading part of the data area. This arrangement permits automatic tracking control without adjusting the timing of recording signal beforehand.

In the case of this embodiment, when the head A— enters the data area passing through the pilot area, the clock signal is locked to the recording data by the PLL circuit 128 of the detection part. At that moment, the head A+ is already in the data area. Therefore, the PLL circuit 126 has already been locked. After the lapse of a given period of time from the phase locking at the two PLL circuits, a sample-and-hold timing pulse is generated as shown in FIG. 13(f). It is also possible to have the sample-and-hold timing pulse of FIG. 13(f) obtained from the wave form of FIG. 13(a) through a delay circuit.

The inter-channel phase difference signal S130 mentioned in the foregoing is obtained in a wave form as shown in FIG. 13(g) by phase comparing the PLL clock signals of the detectors respectively provided for the heads. Referring to FIG. 13(g), a disturbance which takes place in the inter-channel phase difference signal immediately after the head A— enters the data area is caused by the locking action of the PLL circuit. After phase locking, the level of the signal stably remain at a value V4.

The tracking error signal S142 and the phase difference signal S130 are supplied to a differential amplifier 146. The differential amplifier 146 then produces a difference value, which is sampled and held by a sample-and-hold (S/H) circuit 148 (see FIG. 13(e)). After the sample-and-holding action, a sample-and-hold signal S148 thus obtained is supplied to a differential amplifier 150 along with the inter-channel phase difference signal S130. The differential amplifier 150 then produces an output representing a difference between the signals S130 and S148 to give a tracking control signal S150 which covers the whole length of the track. This signal S150 is applied to a capstan control circuit 154 and a piezoelectric element control circuit 156 through an interpolation circuit 152 (described later) for a tracking control action. More specifically, in the case of this (the third) embodiment wherein the positions of the rotary heads are arranged to be movable by means of a bimorph element or the like, the heads A+ and A— are simultaneously moved according to a tracking control signal S152 in such a way as to enable the heads to follow any curving parts of the tracks.

The above-stated tracking control signal S150 lasts until the head A— reaches the rear end of the track. After that, another tracking control signal S150 is likewise formed from the outputs of other heads B+ and B—. There arises a period of time during which no tracking control signal is obtained at the time of changeover from one tacking control signal to the other, although the period is brief. During this period, therefore, a timing signal S144B which is as shown in FIG. 13(i) is supplied to the interpolation circuit 152 from a timing forming circuit 144. This signal S144B causes the interpolation circuit 152 to perform an interpolating operation, for example, by holding a previous value.

The tracking control arrangement described enables the third embodiment to adequately perform tracking control by controlling only the capstan to have the heads trace even such a curved track along a one-dot chain line as shown in FIG. 15(a). Further, the use of the head moving mechanism enables the embodiment to perform tracking control in such a way as to cause the heads to trace the track along a two-dot chain line of FIG. 15(a). Whereas, in accordance with the conventional tracking control arrangement which depends solely on pilot signals, the head traces the curved track along a one-dot chain line as shown in FIG. 15(b). Therefore, the conventional tracking control is incapable of giving a sufficient output for the latter half of the track.

As described above, the third embodiment is arranged to form the phase difference signal S130 on the basis of a phase difference between clock signals locked by the PLL circuits. However, a phase difference signal obtained on the basis of ID pulses or PLL clock signals frequency divided by an n number is likewise usable. While the invention is applied to a digital VTR in the case of the third embodiment described, the invention is applicable also to an analog VTR. In the event of the analog VTR, a phase difference may be obtained from between horizontal sync signals or burst signals instead of the PLL clock signals.

Further, the third embodiment is arranged to reproduce signals of two channels in parallel. However, the number of channels may be arranged more than two. In that instance, if information is recorded only in one channel, the invented arrangement is likewise applicable by adding a reproducing head of an opposite azimuth.

FOURTH EMBODIMENT

In the case of the embodiment described in the foregoing, the data area is handled as one area. However, this invention is applicable also to such a case where the data area is divided into a plurality of areas before and after a pilot area P including, for example, a sub-code area SUB, a video area VIDEO, an audio area AUDIO, etc. as shown in FIG. 16. In this instance, the longest area (the video area VIDEO in this case) is preferably located immediately after the pilot area P. Further, in a case where tracking control cannot be adequately accomplished by controlling the head position only for one area (the video area for example), such as in cases where the audio area AUDIO occupies more than 20% of the whole track length or where a plurality of audio areas exist as in the case of a multi-channel audio recorder, the reference phase is reset at a boundary between one area and another.

FIG. 17 shows by way of example a circuit arrangement which corresponds to the tracking control part 100 of FIG. 10. In this case, the tracking control part includes a reset circuit which is arranged to reset the reference phase at each boundary between one area and another. In FIG. 17, the same component parts as those of FIG. 10 are indicated by the same reference numerals. The tracking control circuit operates as follows:

Immediately before the head passes the boundary, the tracking control signal S150 for the head is held by a second sample-and-hold circuit 182 and is supplied to the differential amplifier 146 via a switch 180. After the head passes through the boundary part, a phase difference between the locked signal S130 and the signal S150 is held by the first sample-and-hold circuit 148 to be used as the reference phase. In other words, the tracking state obtained for the preceding area of the track is used as the basis of tracking control for an area into which the head has entered. If necessary, the tracking control signal may be held by the interpolation circuit 152 also for the boundary part.

The tracking control part which is arranged as described above and as shown in FIG. 17 permits the so-called insert editing whereby the track can be rewritten in part as desired.

The invented tracking control device described is not only capable of performing automatic tracking control with a high degree of interchangeability but also capable of adequately operating even for tracks which are narrowed for high density recording.

What is claimed is:

1. An apparatus for reproducing signals of a plurality of channels from a recording medium having said signals of plural channels recorded in parallel, said signals of plural channels respectively including digital signals, comprising:
   a) a plurality of head means for reproducing said signals of plural channels by tracing in parallel said recording medium;
   b) a plurality of extracting means for extracting specific signals from a plurality of signals reproduced by said plurality of head means, each of said plurality of extracting means including a phase-locked loop which is arranged to generate a clock signal in synchronism with clock signal components of said digital signals;
   c) detecting means for detecting a phase difference between said specific signals extracted by said plurality of extracting means; and
   d) tracking control means for controlling the position of said plurality of head means relative to said recording medium in accordance with said phase difference detected.

2. An apparatus according to claim 1, wherein said plurality of extracting means respectively include frequency dividing circuits which are arranged to frequency-divide said clock signals.

3. An apparatus according to claim 1, wherein said tracking control means includes a circuit for generating a tracking control signal which is at a level corresponding to said phase difference.

4. An apparatus according to claim 3, wherein each of said plurality of reproduced signals has a specific period during which said specific signal cannot be extracted, and wherein said tracking control means includes an interpolation circuit which is arranged to interpolate said tracking control signal during said specific period.

5. An apparatus according to claim 1, wherein said recording medium is in a tape-like shape, and further comprising transport means for longitudinally moving said tape-shaped recording medium.

6. An apparatus according to claim 5, wherein said tracking control means is arranged to control said transport means.

7. An apparatus according to claim 5, wherein said head means includes a rotary head and head shifting means for shifting said rotary head in the direction of crossing a rotation plane of said head, and wherein said tracking control means is arranged to control said head shifting means.

8. An apparatus for reproducing an information signal from a recording medium on which recording tracks of said information signal are formed in parallel, comprising:
   a) head means for reproducing said information signal by tracing said recording medium;
   b) first means for generating a first detection signal at a level corresponding to the phase of a specific signal included in said signal reproduced by said head means;
   c) second means for generating a second detection signal in accordance with a difference in level between pilot signals reproduced respectively from adjacent tracks located on both sides of one track being mainly traced by said head means, said pilot signals being recorded only at a predetermined area in each of said tracks, said second means including a sample-and-hold circuit which is arranged to produce said second detection signal by sampling and holding a signal having a level corresponding to the difference in level between said pilot signals at a timing of tracing said predetermined area by said head means; and
   d) tracking control means for controlling the position of said head means relative to said recording medium by using said first and second detection signals.

9. An apparatus according to claim 8, wherein said recording medium is in a tape-like shape, and further comprising transport means for longitudinally moving said tape-shaped recording medium.

10. An apparatus according to claim 9, wherein said tracking control means is arranged to control said transport means.

11. An apparatus according to claim 9, wherein said head means includes a rotary head and a head shifting means which is arranged to shift said rotary head in the direction of crossing the rotation plane of said rotary head, and wherein said tracking control means is arranged to control said head shifting means.

12. An apparatus for reproducing an information signal from a recording medium on which recording tracks of said information signal are formed, comprising:
   a) head means for reproducing said information signal by tracing said recording medium;
   b) first means for generating a first detection signal at a level corresponding to the phase of a specific signal included in said signal reproduced by said head means;

c) second means for generating a second detection signal at a level corresponding to the level of a pilot signal included in said signal reproduced by said head means, said pilot signal being recorded only at a predetermined area in each of said tracks; and d) tracking control means for controlling the position of said head means relative to said recording medium by using said first and second detection signals, said tracking control means including a first subtraction circuit which is arranged to generate a third detection signal at a level corresponding to a difference in level between said first and second detection signals, and a sample-and-hold circuit which is arranged to generate a fourth detection signal by sampling and holding said third detection signal at a timing of tracing said predetermined area by said head means.

13. An apparatus according to claim 12, wherein said tracking control means further includes a second subtraction control means further includes a second subtraction circuit which is arranged to generate a tracking control signal for controlling the position of said head means relative to said recording medium, said tracking control signal having a level corresponding to a difference in level between said first detection signal and said fourth detection signal.

14. An apparatus for reproducing an information signal of a plurality of channels from a recording medium on which recording tracks of said information signal of a plurality of channels are formed, comprising:

a) head means for reproducing said information signal by tracing said recording medium, said head means including a plurality of heads which are arranged to trace in parallel said recording medium;

b) first means for generating a first detection signal at a level corresponding to the phase of a specific signal included in said signal reproduced by said head means, said first means including a plurality of extraction circuit which are arranged to extract said first specific signal from each of signals reproduced by said plurality of heads and a detection circuit which is arranged to detect a difference in phase between extracted first specific signals thus extracted by said plurality of extraction circuits;

c) second means for generating a second detection signal at a level corresponding to the level of a second specific signal included in said signal reproduced by said head means; and d) tracking control means for controlling the position of said head means relative to said recording medium by using said first and second detection signals.

15. An apparatus for reproducing an information signal from a recording medium on which tracks are formed with said information signal recorded therein, comprising;

a) head means for reproducing said information signal by tracing said recording medium;

b) first means for generating a first detection signal at a level corresponding to a change in the positional deviation of said head means from said tracks;

c) second means for generating a second detection signal at a level indicating the degree of positional deviation of said head means from said tracks as obtained at the timing of tracing a specific part of each of said tracks by said head means; and d) tracking control means for controlling the position of said head means relative to said recording medium by using said first and second detection signals, said tracking control means including a first subtraction circuit which is arranged to generate a third detection signal at a level corresponding to a difference in level between said first and second detection signal, and a sample-and-hold circuit which is arranged to generate a fourth detection signal by sampling and holding said third detection signal at the timing of tracing said recording medium in the vicinity of said specific part by said head means.

16. An apparatus according to claim 15, wherein said tracking control means further includes a second subtraction circuit which is arranged to generate a tracking control signal for controlling the position of said head means relative to said recording medium, said tracing control signal being at a level corresponding to a difference in level between said first and fourth detection signals.

* * * * *

UNITED STATES PATENT AND TRADEMARK OFFICE
CERTIFICATE OF CORRECTION

PATENT NO. : 5,212,603
DATED : May 18, 1993
INVENTOR(S) : Masahide Hasegawa

It is certified that error appears in the above-identified patent and that said Letters Patent is hereby corrected as shown below:

In the drawings, Fig. 1, Change "S'YNC" to -- SYNC --

Col. 2, line 11. Delete "detection signal is" and insert -- (i) In this case, a rotary head phase detection signal is --

Col. 3, line 18. Change "FIG. 1" to -- FIG. 2 --

Col. 5, line 40. Delete "s"

Col. 7, line 59. Change "occurred" to -- occurring --

Col. 8, line 24. Change "circuits" to -- circuit --

Col. 9, lines 60 and 62. After "of" insert -- the --

Col. 11, line 32. After "of" insert -- the --

Col. 11, line 54. Change "remain" to -- remains --

Col. 12, line 16. Change "tacking" to -- tracking --

Col. 15, lines 21 and 22. Delete "further includes a second subtraction control means"

Col. 15, line 43. Change "circuit" to -- circuits --

Signed and Sealed this

First Day of February, 1994

Attest:

BRUCE LEHMAN

*Attesting Officer*     *Commissioner of Patents and Trademarks*